United States Patent
Gadd et al.

(10) Patent No.: US 11,237,725 B1
(45) Date of Patent: Feb. 1, 2022

(54) TRACKING LINK GENERATION USING KEYBOARD INTERCEPTION ON MOBILE DEVICES

(71) Applicant: Kindred Soul Ltd., London (GB)

(72) Inventors: Michael Gadd, London (GB); Aaron Simpson, London (GB); Matthew Larter, London (GB); Shems Eddine Boukhatem, London (GB); Robyn Chin, London (GB)

(73) Assignee: Kindred Soul Ltd., London (GB)

( * ) Notice: Subject to any disclaimer, the term of this patent is extended or adjusted under 35 U.S.C. 154(b) by 0 days.

(21) Appl. No.: 17/236,646

(22) Filed: Apr. 21, 2021

Related U.S. Application Data

(60) Provisional application No. 63/156,153, filed on Mar. 3, 2021.

(51) Int. Cl.
  *G06F 3/0489*   (2013.01)
  *G06F 16/242*   (2019.01)
  *G06F 3/0481*   (2013.01)

(52) U.S. Cl.
  CPC ........ *G06F 3/04895* (2013.01); *G06F 3/0481* (2013.01); *G06F 16/2423* (2019.01)

(58) Field of Classification Search
  CPC . G06F 3/04895; G06F 3/0481; G06F 16/2423
  USPC .......................................... 345/168
  See application file for complete search history.

(56) References Cited

U.S. PATENT DOCUMENTS

| | | | |
|---|---|---|---|
| 8,347,398 B1* | 1/2013 | Weber | G06F 21/85 |
| | | | 726/26 |
| 10,055,103 B1* | 8/2018 | Ozuysal | G06F 3/0482 |
| 10,423,303 B1* | 9/2019 | Roach | G06F 3/0482 |
| 10,887,201 B2* | 1/2021 | Park | G06F 11/3495 |
| 2001/0047347 A1* | 11/2001 | Perell | G06F 21/645 |
| 2005/0027670 A1* | 2/2005 | Petropoulos | G06F 16/9535 |

(Continued)

FOREIGN PATENT DOCUMENTS

| WO | 2014117244 A1 | 8/2014 |
|---|---|---|
| WO | 2017072589 A2 | 5/2017 |
| WO | 2018191030 A1 | 10/2018 |

OTHER PUBLICATIONS

Robert Heaton; How does online tracking actually work?; Nov. 20, 2017; robertheaton.com; pp. 1-15.*

*Primary Examiner* — Andrew R Dyer
(74) *Attorney, Agent, or Firm* — EIP US LLP

(57) ABSTRACT

Systems and methods relating to a keyboard interceptor are disclosed. The keyboard interceptor receives a first input by a user into a keyboard application on a mobile device. A search query is generated based on the first input and data is located based on the search query. The data is associated with a record comprising a record identifier. The keyboard interceptor associates a GUI element of the keyboard application with the record identifier. A second input is received corresponding to selection of the GUI element. A unique tracking link is generated comprising a URL associated with the locate data and an identifier associated with the selection of the GUI element. The unique tracking link is passed to a web browser application executing on the mobile device to access the website. The web browser application stores a cookie comprising the identifier associated with the selection of the GUI element.

18 Claims, 7 Drawing Sheets

(56) References Cited

U.S. PATENT DOCUMENTS

| | | | |
|---|---|---|---|
| 2005/0043939 A1* | 2/2005 | Trower | G06F 40/274 704/8 |
| 2006/0055780 A1* | 3/2006 | Zemer | H04N 3/20 348/173 |
| 2007/0011340 A1* | 1/2007 | Seidl | G06F 16/958 709/228 |
| 2008/0082905 A1* | 4/2008 | Martinez | G06F 16/954 715/205 |
| 2011/0099251 A1* | 4/2011 | Tsukada | G06F 16/958 709/219 |
| 2012/0197981 A1* | 8/2012 | Chan | G06Q 30/0276 709/203 |
| 2013/0073388 A1* | 3/2013 | Heath | G06Q 30/02 705/14.53 |
| 2013/0205198 A1* | 8/2013 | Cohen | G06F 40/143 715/240 |
| 2013/0227057 A1* | 8/2013 | Goldstein | H04L 43/08 709/217 |
| 2015/0073892 A1* | 3/2015 | Brown | G06Q 30/0246 705/14.45 |
| 2015/0143269 A1* | 5/2015 | Liu | G06F 3/0488 715/763 |
| 2015/0154660 A1* | 6/2015 | Weald | G06Q 30/0277 705/14.73 |
| 2016/0103876 A1* | 4/2016 | Bakir | G06F 16/24534 707/722 |
| 2017/0032147 A1* | 2/2017 | Denner | H04W 12/02 |
| 2017/0054820 A1* | 2/2017 | Webber | H04L 67/22 |
| 2017/0193481 A1 | 7/2017 | Szeto et al. | |
| 2018/0046637 A1* | 2/2018 | Koopman | G06F 16/958 |
| 2018/0293601 A1 | 10/2018 | Glazier | |
| 2018/0293602 A1 | 10/2018 | Glazier et al. | |
| 2018/0293603 A1 | 10/2018 | Glazier et al. | |
| 2019/0066156 A1 | 2/2019 | McMichael et al. | |
| 2019/0347685 A1 | 11/2019 | Glazier et al. | |
| 2020/0082423 A1 | 3/2020 | Glazier et al. | |
| 2020/0242648 A1 | 7/2020 | Glazier et al. | |
| 2020/0364734 A1 | 11/2020 | Glazier et al. | |
| 2021/0124630 A1* | 4/2021 | Chew | G06F 16/958 |
| 2021/0192003 A1* | 6/2021 | Kargaran | G06F 16/9554 |

* cited by examiner

TRACKING LINK GENERATION USING KEYBOARD INTERCEPTION ON MOBILE DEVICES

CROSS-REFERENCE TO RELATED APPLICATIONS

This application claims the benefit of U.S. Provisional Application No. 63/156,153, filed Mar. 3, 2021. The above-referenced patent application is incorporated by reference in its entirety.

BACKGROUND OF THE INVENTION

Field of the Invention

The present disclosure relates to mobile computing devices. In particular, the present disclosure relates to a method and system for intercepting user inputs and more particularly to a keyboard interceptor for mobile computing devices.

Description of Related Art

Web browsers are software applications that provide access to the World Wide Web. On many computing devices, such as desktop computers, web browser extensions are available for web browsers. A web browser extension is a software application that adds a capability, utility, or functionality to a web browser. Mostly, web browser extensions extend or enhance the functionality of the web browser, interact with websites, provide proactive information based on browsing, or provide useful tools to enhance the user experience.

Web browsers are also available for mobile devices and offer similar functionality to their desktop counterparts. On mobile devices, some web browsers, such as Safari® on iOS® and Chrome™ on Android™, lack web browser extension support. Thus, the enhanced functionality provided by web browser extensions may not be available to mobile device users. There are several reasons why web browser extensions are not available on some mobile web browsers. For example, extensions present on a laptop or desktop may not be intuitive enough to use on the screen sizes available on mobile devices. There are also security restrictions within mobile operating systems, and limitations with web browser application capacity. Further, mobile operating systems may prioritise stability and therefore have fewer features compared to desktop based operating systems.

SUMMARY

According to a first aspect of the present disclosure, there is provided a computer-implemented method comprising:
receiving a first input by a user into a keyboard application on a mobile device;
generating a search query based on the first input;
locating data based on the search query, wherein the data is associated with a record, the record comprising a record identifier;
associating, within a user interface of the keyboard application, an element of a graphical user interface, GUI, of the mobile device, with the record identifier;
receiving a second input, by the user, corresponding to selection of the element of the GUI;
responsive to receiving the second input, generating a unique tracking link comprising a URL and an identifier associated with the selection of the GUI element, the URL being for a website associated with the located data;
passing the unique tracking link to a web browser application executing on the mobile device, whereby to access the website; and
storing, by the web browser application while accessing the website, a cookie comprising the identifier associated with the selection of the GUI element.

The computer-implemented method may be at least partially performed by a keyboard interceptor on the mobile device. Therefore, the computer-implemented method provides replicated functionality of desktop web browser extensions for the mobile device by means of a keyboard interceptor.

The computer-implemented method provides a convenient search for the websites based on the first input by the user. Storing a cookie comprising the identifier associated with the selection of the GUI element allows tracking of the user's activity on the website as a result. The tracking may be used to associate a particular activity with the user. Furthermore, the form of the unique tracking link is secure because it does not contain any user information. Therefore, a third party who snoops on the user as they browse the website will not be able to associate the particular activity of the user on the website with any individual.

The identifier associated with the selection of the GUI element may be randomly generated.

The user may be able to provide input via one or more fields of the user interface of the keyboard application. The method may further comprise determining that the field into which the first input is provided is a field that is designated for Uniform Resource Locators and/or internet searches. Locating the data may include forwarding an application programming interface, API, call to a server. Generating the unique tracking link may then comprise forwarding a further API call to the server requesting the unique tracking link. Locating the data may include performing a search of a local storage of the mobile device. The server may store the generated unique tracking link in the database.

The first input may be text typed by the user. The method may further comprise waiting a predetermined amount of time after the user has finished typing before generating the search query. Waiting a predetermined amount of time increases the efficiency of the method by reducing the number of computations that need to be performed.

The unique tracking link may comprise the URL encoded with the identifier associated with the selection of the GUI element. The data may be merchant data, and the URL may be a redirect URL for a website associated with the merchant. The merchant data may further comprise a logo associated with the merchant, and an active deal associated with the merchant. In this case, associating the element of the GUI with the record identifier may comprise displaying the logo associated with the merchant and text indicating the active deal. The cookie may allow the merchant to determine that a purchase has been made by the user. The method may further comprise receiving a reward issued by the merchant in response to the purchase made by the user.

In the case that the server generates the unique tracking link, the server may further store the unique tracking link in the database and associate it with a user identity. Therefore, because the cookie comprises the identifier associated with the selection of the GUI element that is assigned when the unique tracking link was generated, and because the unique tracking link may be stored in association with the user identity when the unique tracking link is generated, the merchant can identify the user as being sent to their website via an action of the server. The merchant may therefore provide an entity associated with the server a commission based on the purchase.

The method may further comprise displaying an icon within a user interface of the keyboard application indicating that the data has been located. A further input, by the user, may be received corresponding to selection of the icon. In this case, displaying the element of the GUI is responsive to receiving the further input.

According to a second aspect of the present disclosure there is provided a mobile device configured with a set of instructions which when executed by the mobile device cause the mobile device to perform the above-described method.

According to a third aspect of the present disclosure there is provided a system. The system comprises a keyboard application with a keyboard interceptor, a database and a server communicatively coupled to the database. The database comprises a plurality of records, each of the records comprising: a record identifier; data; and a URL for a website associated with the data. The server is configured to locate data in the database in response to receiving an API call. The system is configured to perform the method according to the first aspect of the present disclosure.

Further features and advantages of the invention will become apparent from the following description of preferred embodiments of the invention, given by way of example only, which is made with reference to the accompanying drawings.

DETAILED DESCRIPTION

Web browsers running on certain computing devices, such as desktop computing devices, may interface with one or more web browser extensions. A web browser extension may enhance a certain functionality of the web browser. In one example, a web browser extension monitors a purchase made by a user on a website. The web browser extension may, either before or after the purchase, analyse the URL of the website and determine whether a merchant associated with the URL has an agreement with the web browser extension developer. The agreement may involve the merchant providing the developer a commission for sending the user to the website in order to make the purchase. In return, a portion of the commission may be awarded to the user. The portion of the commission awarded to the user may be in the form of cash back, discount codes, donations for charity, or another financial incentive.

On certain mobile web browsers, such as Safari® on iOS®, and Chrome™ on Android™, web browser extensions are not available. The embodiments described herein relate to a keyboard interceptor for mobile devices. A keyboard interceptor is software that replicates the same level of interactivity, information and utility found in a desktop or laptop web browser extension but is separate from a mobile web browser. Various implementations of such a keyboard interceptor will now be described.

Single User Implementation

In an example implementation of the present disclosure, a keyboard interceptor, operating on a mobile device of a user, generates a unique tracking link and passes it to a web browser application executing on the user's mobile device. This single user implementation will now be described in detail with reference to FIGS. 1-6.

Figure 1:
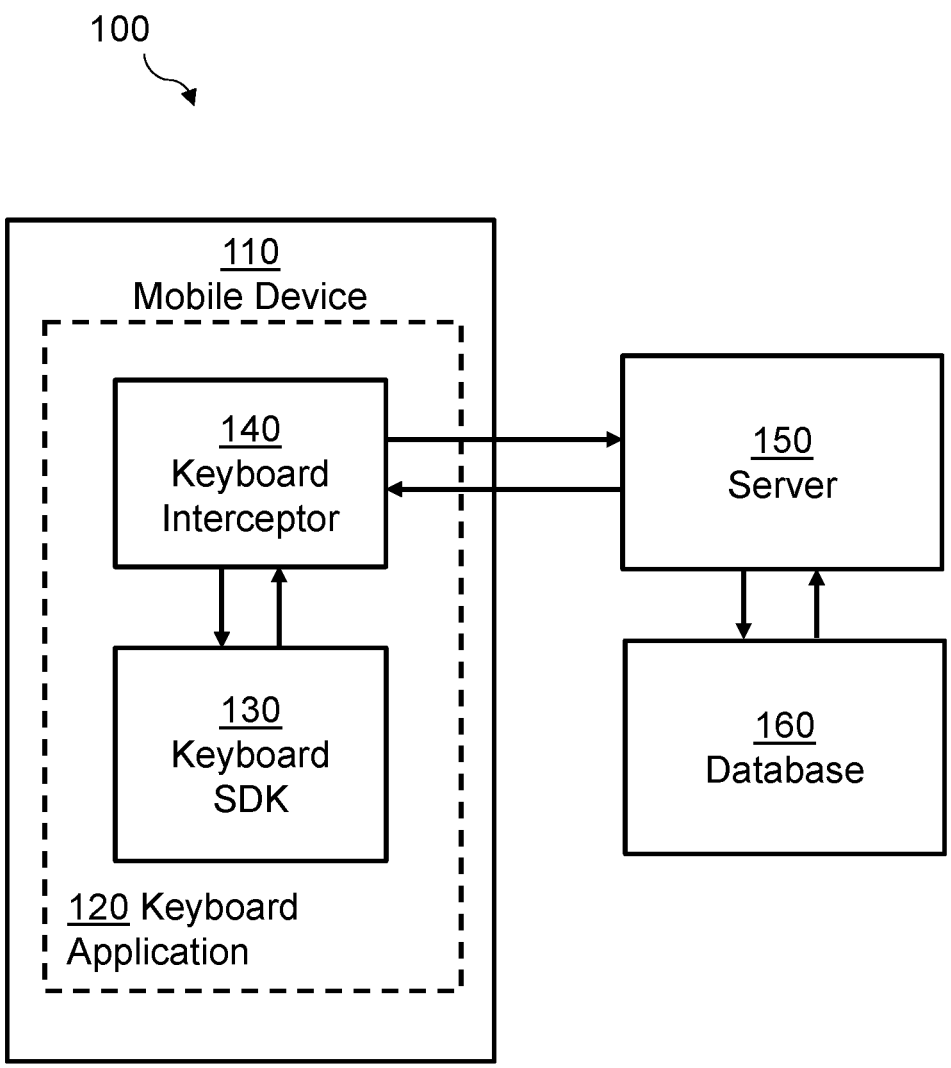
FIG. 1 illustrates schematically a system according to an example.

FIG. 1 illustrates schematically a system 100 according to an example. The system 100 comprises a mobile device 110, a server 150 and a database 160. The mobile device 110 is a mobile computing device that generally supports a mobile operating system, such as a smart phone and a tablet computer. The mobile device 110 is communicatively coupled to the server 150. The server 150 is further communicatively coupled to the database 160. The database 160 stores data relating to brands, and for any given brand the data may be stored in fields of the database, the fields comprising one or more of URLs, metadata such as offers, keywords, categories and descriptions etc. of that brand.

The mobile device 110 comprises a keyboard application 120. Third-party, or custom, keyboards are available on mobile devices and provide an alternative to native keyboards that are included as part of the mobile operating system. Custom keyboards can be provided as a software development kit (SDK) to include within an application that acts as a container for the SDK, wherein the SDK provides keyboard functionality. Thus, a user wanting to use a custom keyboard must download an application that includes a keyboard with custom keyboard functionality. It will be appreciated that custom keyboards are not limited to those provided by an SDK but can be custom built within the mobile application itself. This functionality is detectable by the mobile operating system. The user can change input methods from the native keyboard to the custom keyboard through the settings, for example. A keyboard application, such as the keyboard application 120 in FIG. 1, will be understood to mean a container application including an SDK providing keyboard functionality. Further, an SDK providing keyboard functionality will be referred to as a keyboard SDK. The keyboard application 120 may be provided by an entity associated with the server. Alternatively, the keyboard application 120 may be provided by a third-party that differs from the entity associated with the server 150. The third-party may be an entity that provides goods and/or services in exchange for payment. For example, the third party may be a subscription service provider, a utility service provider, or a merchant selling goods. In one example, the keyboard application 120 may be provided as part of a mobile network billing application. The mobile network billing application may be downloadable from an application repository compatible with the operating system running on the mobile device 110 or may be preloaded onto the mobile device 110. The mobile network billing application may be required for a user to monitor information associated with an account registered with the mobile network.

In the example shown in FIG. 1 the keyboard application 120 enables a user to interact with the mobile device 110 through functionality provided to the keyboard application via keyboard SDK 130, which is to be understood to be an exemplary keyboard SDK having the features described above. The keyboard SDK 130 enables the keyboard application 120 to display a virtual keyboard on a touchscreen of the mobile device 110, through which a user may type characters into the mobile device 110. The characters may relate to any language and/or symbols. In another example, the keyboard SDK 130 may be operatively associated with a software component that converts speech to text for display by the keyboard application 120 via a user interface.

In embodiments described herein, the mobile device 110 further comprises a keyboard interceptor 140. The keyboard interceptor 140 is provided as part of the keyboard application 120, for example as part of a container application further comprising an SDK that provides keyboard functionality. The keyboard interceptor 140 is configured to monitor input via the functionality provided by the keyboard SDK 130. That is, the keyboard interceptor 140 tracks an input in the form of typed text or text resulting from speech to text etc. The keyboard SDK 130 includes an event listener application programming interface (API). The event listener API allows the keyboard interceptor 140 to receive event notifications indicating input to the keyboard by the user. In the example where a user is typing, the keyboard SDK 130 may include a specific text input monitoring API. The keyboard interceptor 140 can then communicate with the keyboard SDK 130 via the text input monitoring API to receive event notifications corresponding to text entered by the user. In a further example, the keyboard interceptor 140 may receive every event notification issued via the event listener API and determine which event notifications correspond to entered text.

Based on a first input entered using the keyboard application 120, the keyboard interceptor 140 generates a search query. The search query may be based on exact content of the first input. For example, if the first input is the text string "jon", then the search query generated by the keyboard interceptor 140 may be based on the text string "jon". In another example, the keyboard interceptor 140 may first modify the first input prior to generating the search query. For example, if the first input is the text string "jon", the keyboard interceptor 140 may modify the text string to "john", and therefore generate a search request based on the text string "john".

The keyboard interceptor 140 then makes an API call to the server 150, causing the server 150 to locate data based on the search query. The request may be sent as a "GET" Hypertext Transfer Protocol (HTTP) request containing the text string "john". On receipt of the HTTP request, the server 150 communicates with the database 160 in order to locate data matching the entered text string (in this example "john"). As explained above, the database 160 stores data relating to brands, and for any given brand the data may be stored in fields of the database, the fields comprising one or more of URLs, metadata such as offers, keywords, categories and descriptions etc. of that brand. For each brand, the data for that brand can be linked via a unique record identifier (ID), which is generated by the server 150.

When the server 150 performs a search of the database 160 for data entries that match the entered text string, the server 150 submits a query that will be executed by the database 160 across all database entries. This may involve communicating with an external service, such as Azure™ search service. When a database entry that matches the query is located, the server 150 retrieves an above-mentioned corresponding unique record ID, and sends that unique record ID in a message to the keyboard interceptor 140 e.g. as a HTTP message. This allows the server 150 to identify entries in the database in future without having to perform a further search. The message may also include data (e.g. name of the brand, logo of the brand) retrieved from one or more of the database fields that match the search query.

In one example, the user may enter a descriptive keyword. This causes the keyboard interceptor to generate a search query for the text "trainer". The server 150 then performs a search of the database 160 for entries relating to the text "trainer". In this example, the database 160 may return e.g. the brand Nike®, if that is stored in a database field in association with keyword "trainer". The message sent to the keyboard interceptor 140 may then indicate that data relating to the brand Nike® has been located based on the search term "trainer". The message also includes a unique record ID, which, as mentioned above, has been generated by the server 150.

The server 150 may provide the keyboard interceptor 140 with one or more authentication tokens as part of an initial configuration process for use by the keyboard application 120 when authenticating the keyboard interceptor to the server 140. The authentication tokens may be issued if the server 150 can determine that the user of the keyboard interceptor 140 is validly registered with the server 150. This may require the user to register an account with an entity associated with the server 150. For example, if the keyboard application 120 is associated with the same entity that is associated with the server 150, then the user may provide login details to the keyboard application 120. Successful login by the user causes the keyboard application 120 to receive an access token that can be used to authenticate communication between the server 150, and the keyboard application 120 and/or the keyboard interceptor 140. When the keyboard application 120 is not associated with the same entity that is associated with the server 150, such as when the keyboard application 120 is associated with a mobile network operator, the keyboard interceptor 140 may communicate directly with the server 150 to receive an access token. The server 150 may also issue one or more refresh tokens to the keyboard application 120 and/or the keyboard interceptor 140. The refresh tokens are configured to renew the access token and may conform to the OAuth protocol.

In either case, the authentication tokens may include information about the user. The information may include one or more identifiers associated with the user. In one example, the identifier associated with the user comprises a device ID. The device ID may be derived from the International Mobile Equipment Identity (IMEI) number of the mobile device 110, which is unique to every mobile phone device. Other examples of device ID are possible. For example, the device ID may be derived from a phone number associated with the mobile device 110. If the identifier associated with user includes a device ID, the keyboard application 120 could be associated with a mobile network operator (a mobile network billing app, for example).

Once the message comprising the unique record ID (and other data returned by the server 150 from the database 160) has been received by the keyboard interceptor 140, the keyboard interceptor 140 associates an element in the graphical user interface (GUI) with the unique record ID. For example, the keyboard interceptor 140 may display, within a user interface of the keyboard application 120, a dedicated element in the GUI. The GUI element serves to notify the user that data has been found that is relevant to what the user entered (in this example, "jon"). The dedicated GUI element may take the form of a button, text, icon, and other interactive elements. Selection of this GUI element may involve the user physically pressing on a region of a display of the mobile device 110 that is presently displaying the GUI element. Alternatively, or in addition, the keyboard interceptor 140 may associate one or more GUI elements already present in the user interface of the keyboard application 120 with the message. For example, when the message is received from the server 150 indicating that data has been located that is relevant to the search query, the keyboard interceptor 140 may associate an enter button, displayed in the user interface of the keyboard application 120, with the unique record ID.

In either case, when the user selects the GUI element, the keyboard interceptor 140 receives a second input corresponding to selection of the GUI element. It is to be understood that selection of the GUI element is an input that is second to, which is to say that it follows, what the user enters in order to seed the initial search query (in this example "jon").

Selection of the GUI element causes the keyboard interceptor 140 to send a request to the server 150 comprising the unique record ID, so that the server 150 can identify the database record(s) for which data was previously retrieved and returned to the keyboard interceptor 140 in response to the search query.

In response, the server 150 retrieves the unique record ID from the message and searches the database 160 for further information associated with the unique record ID. This may comprise a redirect URL for a website associated with the unique record ID. The server 150 then generates a unique tracking link, which comprises a randomly generated click ID and the redirect URL. The unique tracking link optionally additionally comprises parameters such as an Urchin Tracking module (UTM) parameter that provides tracking statistics for the redirect URL. Other types of information, such as a server identifier that identifies the server 150, may be included in the unique tracking link. The server identifier allows for any actions taken by the user on the website associated with the domain name to be attributed to the server 150 generating the unique tracking link that sent the user to the website.

The unique tracking link is then stored in the database 160 in association with the unique record ID and an identifier for the user and is sent back to the keyboard interceptor 140 as e.g. an HTTP message. The keyboard interceptor 140 may pass the unique tracking link to a web browser application executing on the mobile device 110. The unique tracking link may be automatically placed into an address bar of the web browser application, thus, effectively, directing the user to the website following a single click of a GUI element. Alternatively, the unique tracking link may be inserted into the address bar, giving the user the option to follow the link, or to select a different link.

Accessing the website causes the web browser application to store a cookie generated by the website. The cookie comprises the click ID which as described above is present in the unique tracking link. The cookie provides the owner of the website the capability to monitor the user's activity while the user browses the website.

Any actions taken by the user after selecting the GUI element can be attributed to that user by reading the click ID associated with the unique tracking link. When the unique tracking link further comprises a server identifier, an entity associated with the tracking link can provide the server 150 associated with the server identifier an indication of the action taken by the user. The server 150 then compares the unique tracking link received from the entity and the stored unique tracking links. Because the click ID portions of the link will match, the server 150 can then attribute the action to a particular user. Advantageously, the form of the unique tracking link is secure because it does not contain any user information. Therefore, a third party who snoops on the user as they browse the website associated with the unique tracking link will not be able to associate the actions taken by the user with any individual.

In yet another example, the user may have entered the first and second inputs (in this example "jon" and selection of the GUI element displayed by the keyboard application 120) using an application that is not the web browser application. In this case, on selecting the GUI element, the operating system invokes the web browser application, wherein the unique tracking link is automatically placed into the address bar. In any case, passing the unique tracking link to the web browser application instructs the web browser application to access the website corresponding to the URL.

The system 100 described above provides replicated functionality of desktop web browser extensions for mobile devices by means of a keyboard interceptor 140. The system 100 provides a convenient search of websites based on input entered by the user and allows tracking of the user's activity on the website as a result. The tracking may be used to associate a particular activity with the user.

For example, the data within a record in the database 160 may be associated with a merchant associated with a brand, and the monitored activity may be one or more purchases made by the user after the selection of the GUI element as described above. As the cookie comprises the click ID that is assigned when the unique tracking link was generated, and because the unique tracking link is stored in association with the user identity when the unique tracking link is generated, the merchant can identify the user as being sent to their website via an action of the server 150. The merchant may therefore provide an entity associated with the server 150 a commission based on the one or more purchases. This commission may then be partially returned to the user in the form of cash-back & coupon/discount vouchers/codes.

Figure 2:
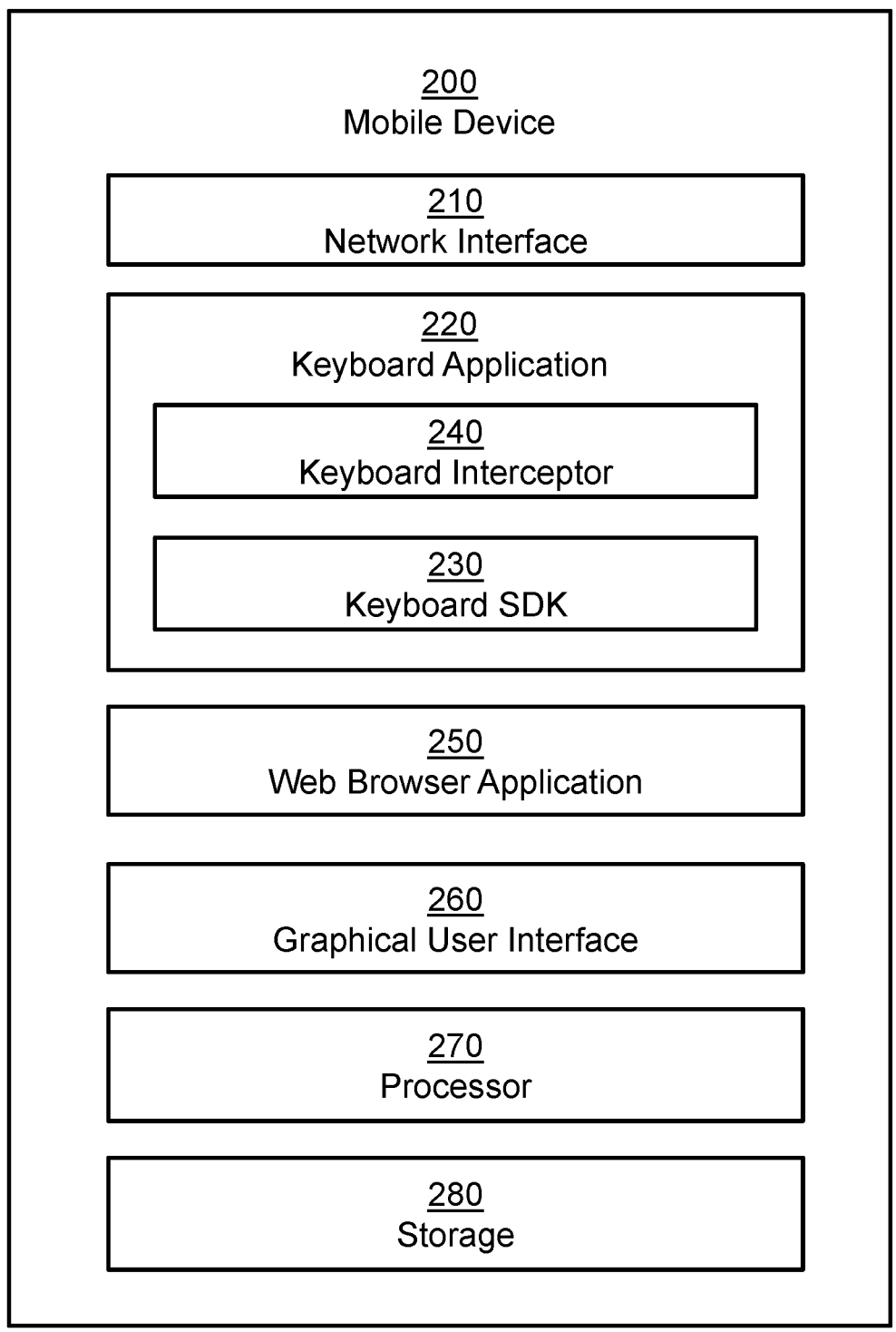
FIG. 2 illustrates schematically a mobile device according to an example.

FIG. 2 illustrates schematically a mobile device 200 according to an example. The mobile device 200 may be the same mobile device 110 of the system 100 shown in FIG. 1. The mobile device 200 is a mobile computing device that supports a mobile operating system. Example mobile devices include any version of iPhone® running iOS®, the mobile operating system developed by Apple Inc. of Cupertino, United States. Other example mobile devices include mobile computing devices running the Android™ operating system developed by Google LLC of Mountain View, United States.

The mobile device 200 comprises a network interface 210, a keyboard application 220, a Web Browser Application 250, a graphical user interface (GUI) 260, a processor 270, and storage 280. The keyboard application 220 comprises a keyboard SDK and a keyboard interceptor 240. The user interface 260 may be a touch sensitive display. The keyboard SDK 230 provides the keyboard application 220 with virtual keyboard functionality that is displayed on the GUI 260 and allows the user to provide input to the mobile device 200. The processor 270 is configured to cause the keyboard interceptor 240 to execute certain instructions.

Figure 3:
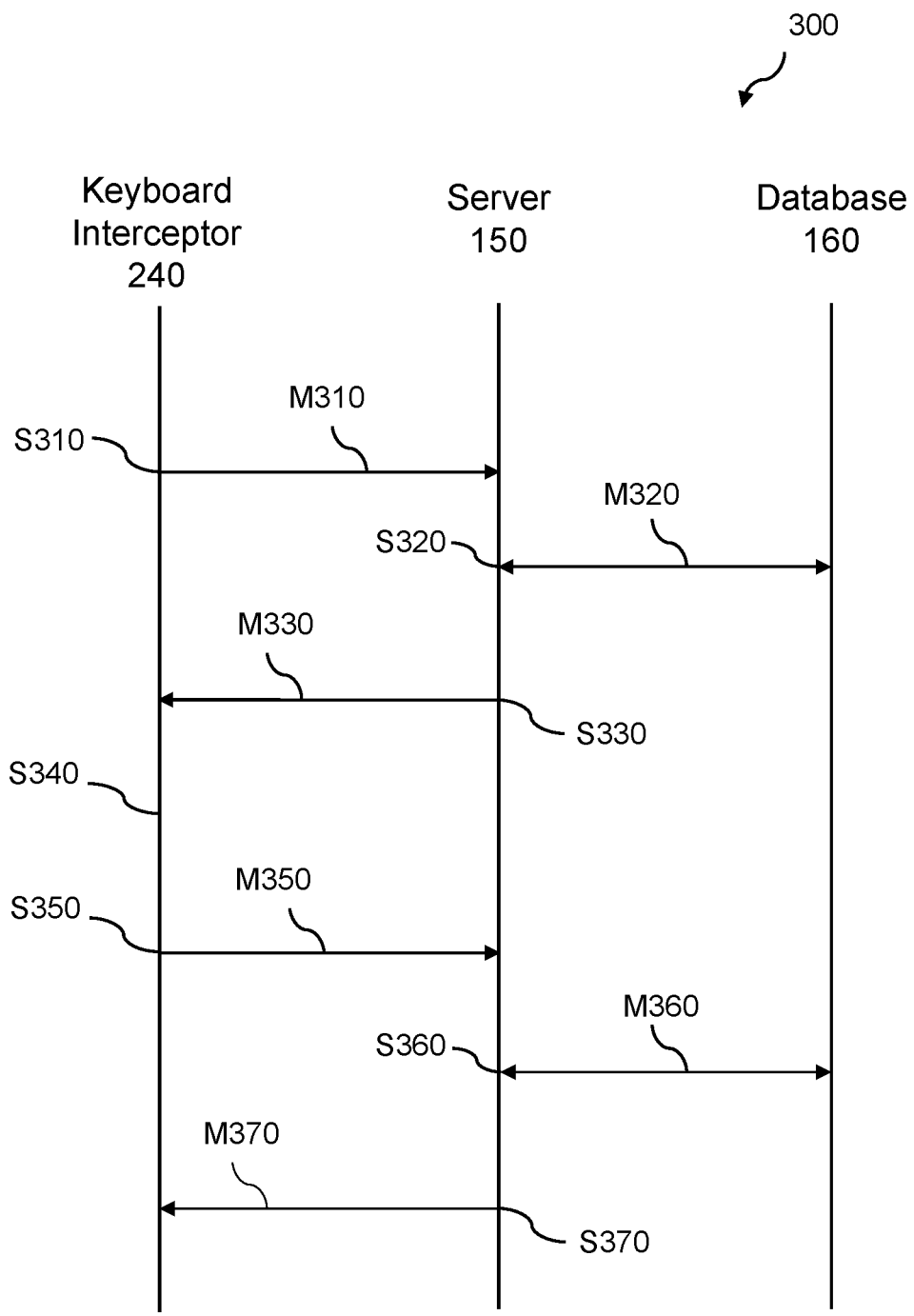
FIG. 3 shows a flow diagram illustrating a process flow according to an example.

As has been described with respect to the system 100, the keyboard interceptor 240 tracks input entered by a user. FIG. 3 is a process flow diagram illustrating the communication flow 300 between the keyboard interceptor 240, the server 150 and the database 160 according to an example implementation. At step S310, the keyboard interceptor 240 has received a first input from a user, as described above. In response, the keyboard interceptor 240 generates a search query associated with the first input. The search query is forwarded to the server 150 via an API call M310. The API call M310 may be a "GET" HTTP request comprising the search query. As discussed above, authenticated communication between the server 150 and the keyboard interceptor 240 may be achieved via an authentication process whereby the server 150 provides one or more authentication tokens to the keyboard interceptor 240. The authentication tokens may include information about the user of the keyboard interceptor 240, such as a device ID.

The data to be located may include data relating to brands, such as one or more of URLs, metadata such as offers, keywords, categories and descriptions etc. of that brand. When the one or more URLs are associated with a merchant, the metadata may include an indication of whether there are any active deals available to the user. As discussed above, associated data can be linked via a unique record identifier (ID), which is generated by the server 150.

The mobile device 200 can communicate with the server 150 via the network interface 210. The network interface 210 may be a wireless interface arranged to facilitate a data flow between the mobile device 200 and the server 150. The network interface 210 may further facilitate a data flow between the mobile device 200 and other remote devices, such as one or more additional servers and other mobile devices connected to the same communications network. For example, the network interface 210 may communicate with remote devices in accordance with a communication protocol. The communication protocol may be any wireless standards including IEEE 802.11a, 802.11b, 802.11g, 802.11n, or 802.15. When the network interface is a wireless interface, the network interface may include one or more radios.

At step S320, the server 150 sends a request M320 to the database 160. The request M320 causes the database to locate data matching the search query. The request M320 may be a Structured Query Language (SQL) query. The request M320 causes the database 160 to search across all database entries for data matching the search query. This may involve communicating with an external service, such as the Azure™ search service.

At step S330, the server 150 sends the unique record ID in a message M330 to the keyboard interceptor 240. The message M330 may be an HTTP message. The message M330 indicates to the keyboard interceptor 240 that data matching the search query has been found.

At step S340, in response to receiving the message M330, the keyboard interceptor 240 associates, within a user interface of the keyboard application 220, a GUI element with the unique record ID. When the keyboard application 220 is a virtual keyboard, the GUI element may be a new GUI element that is displayed in a banner directly above the user interface of the keyboard in response to receiving the message M330. The GUI element may alternatively be a character key within the virtual keyboard.

At step S350, the keyboard interceptor 240 receives the second input corresponding to the user selecting the GUI element. In response, the keyboard interceptor 240 sends a request M340 to the server 150 comprising the unique record ID. The request M350 may be an HTTP "POST" request. The request M350 may be authenticated using any authentication tokens that were retrieved as part of the authentication process described above.

At step S360, the server 150 retrieves information associated with unique record ID by sending a further request M360 to the database 160. The request M360 may be an SQL query. The unique record ID allows the server 150 to identify the database record(s) for which data was previously retrieved via the request M320. In this example the information comprises a redirect URL for a website associated with the unique record ID. The server 150 then generates a unique tracking link comprising a randomly generated click ID and the redirect URL. The unique tracking link may be stored in the database 160 by the server 150.

The unique tracking link optionally additionally comprises parameters such as an Urchin Tracking module (UTM) parameter that provides tracking statistics for the redirect URL. Other types of information, such as a server identifier that identifies the server 150, may be included in the unique tracking link. The server identifier allows for any actions taken by the user on the website associated with the domain name to be attributed to the server 150 generating the unique tracking link that sent the user to the website.

The unique tracking link is then stored in the database 160 in association with the unique record ID. At step S370, the server 150 sends the unique tracking link to the keyboard interceptor 240 via a further message M370. The further message M370 may be an HTTP message, as discussed above.

Once the unique tracking link is available to the keyboard interceptor 240, the unique tracking link is passed to the Web Browser Application 250. When launched, the unique tracking link provides access to the website corresponding to the URL. Accessing the website causes the Web Browser Application 250 to store a cookie generated by the website. The cookie comprises the click ID which as described above is present in the unique tracking link. The cookie provides the owner of the website the capability to monitor the user's activity while the user browses the website.

In a second example implementation, the keyboard interceptor 240 communicates with local storage via the keyboard application 220 in order to locate the data and generate the unique tracking link. In this second example, data, similar to that stored by the database 160 in the first example, may be stored locally in the storage 280. In this case, there may be an initial replication process between the database 160 and the local storage 280, whereby the data stored in the database 160 is copied to the local storage 280. The keyboard application 220 preferably regularly communicates with the server 150 to refresh the data stored locally.

In this second example, the keyboard interceptor 240 receives input entered by the user from the keyboard application 220 and generates a search query. To locate data, the search query is passed to the keyboard application 220. The keyboard application 220 can then perform a search of the local storage 280 to locate data matching the search query. Locating the data may involve an intermediate step of retrieving the data from cache. For example, the data may already be cached in a separate memory (not shown) and so already available to the keyboard application 220, or the data may be located in the storage 280 first and cached into the separate memory before being retrieved by the keyboard application 220. The message, comprising the record identifier, and indicating that the data has been located that matches the search query, is then passed from the keyboard application 220 to the keyboard interceptor 240, causing a GUI element displayed by the keyboard application 220 to be associated with the message. Accessing local storage instead of communicating with a remote server may speed up the process of locating data matching the search query. In this second example, when the user selects the GUI element, the keyboard interceptor 240 forwards a request to the keyboard application 220 that comprises the unique record ID. The keyboard application 220 can then forward the request to the server to generate the unique tracking link.

Figure 4:
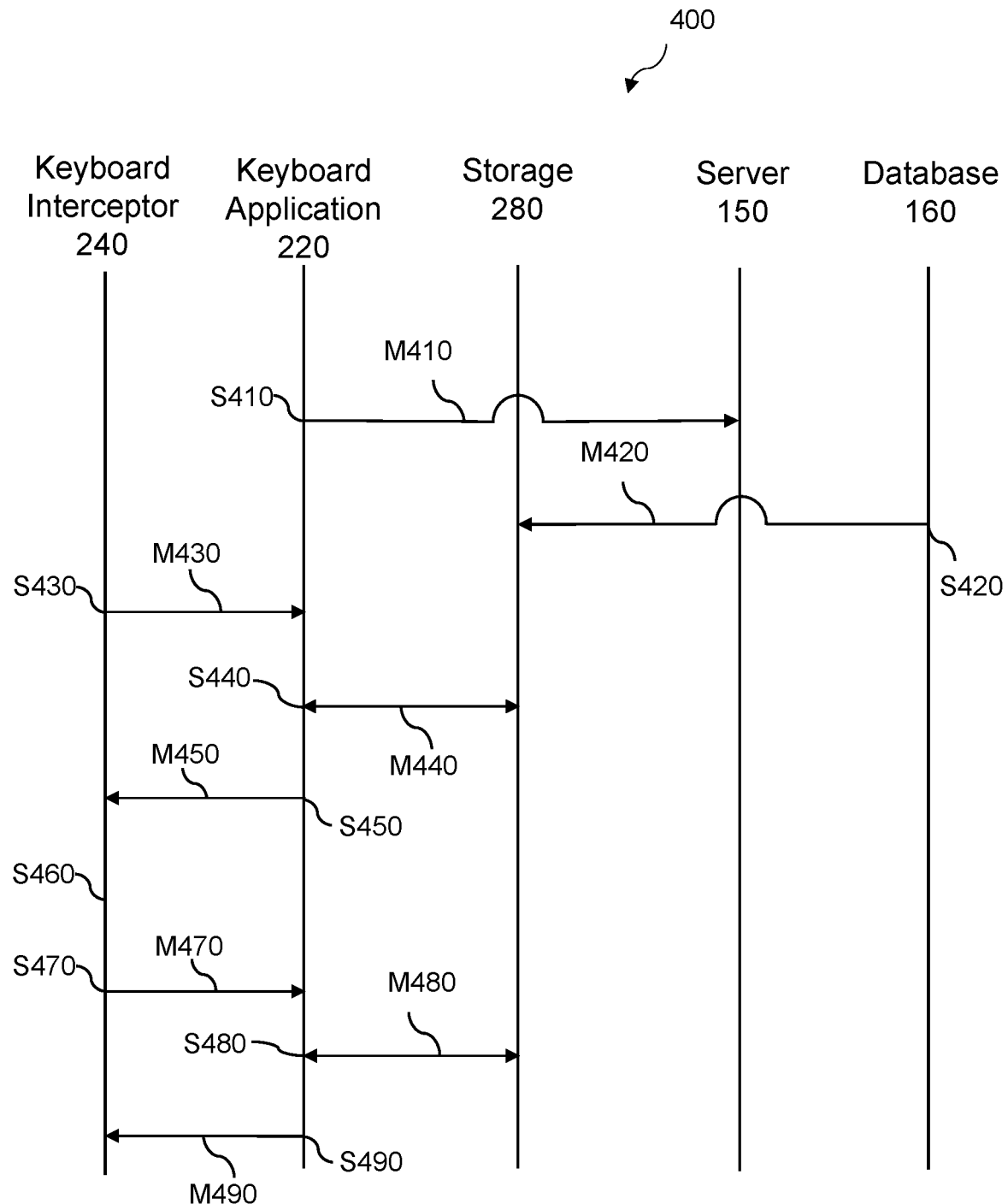
FIG. 4 shows a flow diagram illustrating a process flow according to a further example.

FIG. 4 shows a flow process diagram illustrating a communication flow 400 between the keyboard interceptor 240, the keyboard application 220, the server 150 and the database 160 according to the second example implementation. At step S410, the keyboard application 120 sends a request M410 to the server 150 requesting data stored in the database 160. This may occur as part of an initialisation process when the keyboard application 220 is first installed on the mobile device 200. In this instance, the user may be required to create, or login to, an account associated with the server 150. Said account may grant authorisation of the keyboard application 220 to communicate with the server 150.

At step S420, a data synchronisation process occurs wherein records stored on the database 160 are downloaded onto the storage 280 via a data transfer M420. The data synchronisation process may occur in response to the server 150 determining that the keyboard application 220 can validly communicate with the server 150. The data transfer may be a JavaScript™ Object Notation (JSON) data response. Once the data transfer M420 is completed, the records stored in the database 160 are now also present in the storage 280.

At step S430, the keyboard interceptor 240 receives a first input and generates a search query based on the first input. The keyboard interceptor 240 sends a request M430 comprising the search query to the keyboard application 220. The request M430 may be an API call between the keyboard interceptor 240 and the keyboard application 220.

At step S440, the keyboard application 220 communicates with the local storage 280 in order to locate data that matches the search query. The keyboard application 220 sends a request M440 to the storage requesting data that matches the search query. When data matching the search query is located, the unique record ID associated with the data is retrieved. Locating the data may involve the intermediate step of retrieving the data from cache.

At step S450, after data has been located, the keyboard application 220 sends a message M450 to the keyboard interceptor 240 comprising the unique record ID. The keyboard interceptor 240 then associates a GUI element in the user interface of the keyboard application 220 with the unique record ID.

At step S460, the keyboard interceptor 240 associates, within a user interface of the keyboard application 220, a GUI element with the unique record ID in response to receiving the message M450.

At step S470, the keyboard interceptor 240 receives a second input corresponding to the selection of the GUI element. In response to the second input, the keyboard interceptor 240 sends a request M470 to the keyboard application 220 comprising the unique record ID.

At step S480, the keyboard application 220 sends a further request M480 of the local storage 280 for information associated with the unique record ID. The unique record ID allows the keyboard application 220 to identify the record(s) for which data was previously retrieved via the request M440. The information comprises a redirect URL for a website associated with the unique record ID. The keyboard application 220 then generates a unique tracking link comprising the redirect URL and a random click ID. The unique tracking URL may be stored in the local storage 280 and/or sent to the server 150 via an HTTP message.

At step S490, the keyboard application 220 sends the unique tracking link to the keyboard interceptor 240 via a further message M490.

In a third example implementation using the mobile device 200, the keyboard interceptor 240 receives input entered by the user from the keyboard application 220 and generates a search query. As in the second example, the search query is passed to the keyboard application 220. In this third example, the keyboard application 220 makes an API call to a server to locate data matching the search query. The API call is similar to the API call M310, but is instead between the keyboard application 220 and the server 150. To this end, the keyboard application 220 may further comprise the necessary API functionality required to communicate with the server, in which case the keyboard application 220 may itself send the search query to the server 150 to locate the data. When the data is located, the message comprising the unique record ID is returned to the keyboard application 220 and delivered to the keyboard interceptor 240. The keyboard interceptor 240 then associates, within a user interface of the keyboard application 220, a GUI element with the message. In this third example, when the user selects the GUI element, the keyboard interceptor 240 makes an API call to the keyboard application 220, causing the keyboard application 220 to itself generate an API call to the server 150 for the unique tracking link. As for the other examples, this API call may be sent as an HTTP "GET" request to the server 150.

In a fourth example implementation using the mobile device 200, the keyboard interceptor 240 receives the input entered by the user from the keyboard application 220 and generates a search query. As in the second and third examples, the search query is passed to the keyboard application 220. The keyboard application 220 then performs a search of the local storage 280 to locate data matching the search query. If data relevant to the search request is not found by the keyboard application 220, the search query is then forwarded to the server 150 via an API call, similar to the API call M310, but between the keyboard application 220 and the server 150. This might occur if relevant data is not present in the local storage 280 but is available to the server 150, because the data available to the server may be more up to date. In this fourth example, the unique tracking link may be generated by the keyboard interceptor 240 or by the keyboard application 220. Alternatively, the unique tracking link may be generated by the server 150 in response to receipt of a suitable API call originating at the keyboard interceptor 240, such as the API call M350.

In some examples, the user may be able to provide input via one or more fields of the user interface of the keyboard application. Example field types include a URL field, a password field, and a numerical field. The keyboard interceptor 240 may determine that the field into which the first input is provided is a field that is designated for URLs. Alternatively, or in addition, the keyboard interceptor 240 may determine that the field into which the first input is provided is a field that is designated for searches, examples of which are text fields for search engines. In a further example, the keyboard interceptor 240 may determine that the field into which the first input is provided is neither designated for URLs nor searches. For example, the user may be composing a message addressed to a second user into a messenger application. The keyboard interceptor 240 may still be active and performing steps S310-S370 or S430-S490. In response to receiving a second input from the user corresponding to selection of the GUI element, the keyboard interceptor 240 may cause the Web Browser Application 250 to be launched from the messenger application. The Web Browser Application 250 may be a default Web Browser Application.

The keyboard interceptor 240 may cooperate with any application running on the mobile device 200 in which the user can provide input via the keyboard application 220. The keyboard interceptor 240 may detect the current application into which the user is providing input. Based on this detection, the keyboard interceptor 240 may lookup a list of applications to, or otherwise, determine whether the current application is one that is enabled for use with the keyboard interceptor 240. The list may be stored in the local storage 280 and/or in the database 160. If the keyboard interceptor 240 determines that the current application is in enabled for use, then steps S310-S370 or S430-S490 may be performed. On the other hand, if the keyboard interceptor 240 determines that the current application is not enabled for use, the keyboard interceptor 240 may become inactive and not perform steps S310-S370 or S430-S490. In an example, a particular mobile application may be considered to be not enabled if that mobile application is of a particular type or meets certain prespecified criteria such as being associated with data stored in the database 160. If the keyboard interceptor 240 remained active and data relating to a competitor is also stored in the database, then the user may be given an option between the brand and the competitor in their keyboard application 220.

In some examples, the keyboard interceptor 240 will debounce the search, or wait, for a predetermined amount of time after the user has finished providing the first input before generating the search query. Such debouncing may increase the efficiency of the process by reducing the number of computations that need to be performed. The predetermined amount of time may be a fixed amount of time, such as 0.3 seconds. Alternatively, the predetermined amount of time may be dynamically determined. For example, the keyboard interceptor 240 may utilise a learning algorithm in order to determine an optimal amount of time to debounce the generation of the search query based on the user's usage patterns. In this case, the predetermined amount of time to debounce the generation of the search query for a slower typer may be longer than the predetermined amount of time to debounce the search for a quicker typer. For example, an optimal amount of time to debounce the search for a fast typer would result in unnecessary additional searches for a slower typer because searches may be performed after each key stroke by the slower typer. This may result in locating domain names that are not relevant to the text that will eventually be typed, using unnecessary computational resources to do so.

In an example, the unique record ID is associated with a particular merchant, and the database 160 stores a logo and an active deal associated with the merchant, together with keywords associated with the merchant and any other metadata that may assist in identifying the merchant. The logo associated with the merchant and text indicating the active deal may be included with the unique record ID in the message returned by the server 150 to the keyboard interceptor 240. In this example the logo may be displayed within the GUI element.

As has been discussed above, because the cookie comprises the click ID that is assigned when the unique tracking link was generated, and because the unique tracking link is stored in association with the user identity when the unique tracking link is generated, any actions taken by the user when accessing the website can be linked to the user. The unique tracking link may comprise a further identifier associated with the server 150. The identifier associated with the server 150 allows the merchant to identify the server 150 that directed the user to the merchant's website. The merchant may therefore associate a commission based on the purchase with the server 150, and the user identifier enables an entity associated with the server 150 to identify the user that made the purchase. This allows the entity associated with the server to reward the user with a portion of the commission. The reward may be in the form of cashback, one or more vouchers, a charitable donation, or other financial incentive. Knowing that the user may receive some form of reward for making a purchase on the merchant's website provides an incentive for the user to visit the merchant's website in the first place. Displaying the logo associated with the merchant and text indicating an active deal in the user interface of the keyboard application further incentivises the user to select the GUI element and visit the merchant's website. For example, displaying the logo of a merchant and text such as "up to 3.4% cashback" may direct a user to that merchant, even though the user had not initially planned on visiting that merchant's website.

In a further example, the authentication tokens used by the server 150 that allow authenticated communication between the server 150, and the keyboard application 220 and/or the keyboard interceptor 240 include a device identifier. This is particularly beneficial when the keyboard application 220 is provided by a mobile network operator or other entity that provides goods and/or services in exchange for payment. In this case, a portion of commission rewarded to the user for a purchase may be provided to user as money off the payment. For example, the keyboard application 220 may be a mobile network billing application associated with the mobile network operator. In this example the mobile network billing application comprises an SDK providing the keyboard functionality and a keyboard interceptor 240 described above. In this example, the keyboard interceptor 240, being part of the mobile network billing application, generates the device identifier and forwards it to the server 150. The server 150 may then return the authentication tokens that allows authenticated communication between the server 150 and the keyboard interceptor 240. In this case, the authentication tokens include the device identifier. The device identifier may be generated from at least one of: the IMEI number of the mobile device, and a phone number associated with the device. When the user subsequently makes a purchase on a merchant's website, that merchant will forward commission to the network operator. A portion of the commission can then be passed to the user e.g. as money off the user's next monthly data plan payment, or as credit where that user is on a pay as you go tariff. More generally, when the keyboard application 220 is provided by a third-party that provides goods/services in exchange for payment from the user, the merchant will forward commission to the third-party. A portion of this commission may then be passed to the user. For example, when the third-party provides a subscription service to the user, the portion of the commission passed to the user may be in the form of money off the user's next bill. In a further example, when the third-party is a goods provider, the portion of the commission passed to the user may be in the form of a voucher for money off a next purchase of said goods. In any case, the keyboard interceptor 240 generates the device identifier and forwards it to the server 150. The server 150 responsively returns authentication tokens allowing authenticated communication between the server 150 and the keyboard interceptor 240.

The server 150 may store such information as any identifiers associated with the user, a record of purchases made by that user, and rewards earned by that user.

As mentioned above, it is contemplated that the search query may return a plurality of different records. This may occur if, for example, the input entered by the user is a general term for which there are many matching records. For example, the text "trainer" may be identified as a keyword in a record associated with the merchant Nike® and in a record associated with the merchant John Lewis. In the case where the search query returns a plurality of different records, the keyboard interceptor may associate a plurality of GUI elements on the user interface of the keyboard application with the respective record identifiers. The user can then select one of the plurality of GUI elements which will cause the keyboard interceptor to generate a unique tracking link directed to the selected URL.

In a further example, the keyboard interceptor 240 may cause an icon to be displayed on the user interface of the keyboard application 220. The icon may signify to the user that the keyboard interceptor 240 is currently active and available to search for data when the user begins providing input. In one example, selecting the icon may launch a custom application within the keyboard application 220. A user interface of the custom application may be displayed above the user interface of the keyboard application 220. Alternatively, the user interface of the custom application may take the place of the user interface of the keyboard application 220. Functionality provided by the custom application may be included as part of the keyboard application 220.

In one example, when the search query returns a plurality of different records, the server 150 will generate a corresponding plurality of unique record IDs, each of which is returned to the keyboard interceptor 240. Once received, the keyboard interceptor 240 will display a corresponding plurality of GUI elements, wherein each GUI element is associated with a respective unique record ID generated by the server 150. In some examples, the keyboard interceptor 240 causes an icon to be displayed in the user interface, which provides a notification indicating how many results have been located as part of the search. The notification may be in the form of a number appearing in a corner of the icon. In this way, the number may dynamically alter as the user types and the search query changes. The icon may take the place of the GUI element described above, providing a notification minimised state of the keyboard interceptor. In this case, an indication that relevant data has been located in the search will not immediately be shown to the user as a GUI element, but the icon will indicate that data has been found, by displaying a number, e.g. "1", in the corner of the icon, for example. When the user selects the icon, the GUI element will then be displayed. This notification functionality provides the user with the option of not displaying the GUI element in every instance, but still indicates that data has been located.

When the data is associated with merchants, the custom application may display available deals or other information associated with merchants. The available deals may be displayed without the user providing any input. In this way the user can determine which merchants are currently providing incentives before providing input. Alternatively, or in addition, the merchants displayed in the custom application may be dynamically updated as the user continues typing.

The custom application may itself present an editable GUI element, such as a text field, to the user. In this arrangement, a user typing into the editable GUI element may cause the custom application to function like the keyboard interceptor 240 described above, so that the query search and unique tracking link generation can all be performed by the mini-app.

Alternatively, or additionally, the icon displayed in the user interface of the keyboard application 220 may provide access to a settings menu when selected. The settings may allow a user to adjust one or more settings relating to the keyboard application 220. Example settings that may be adjusted include user interface of the keyboard application 220 appearance, what information relating to the located data should be displayed within the user interface of the keyboard application 220, and preferences regarding which merchants should be shown.

Figure 5A:
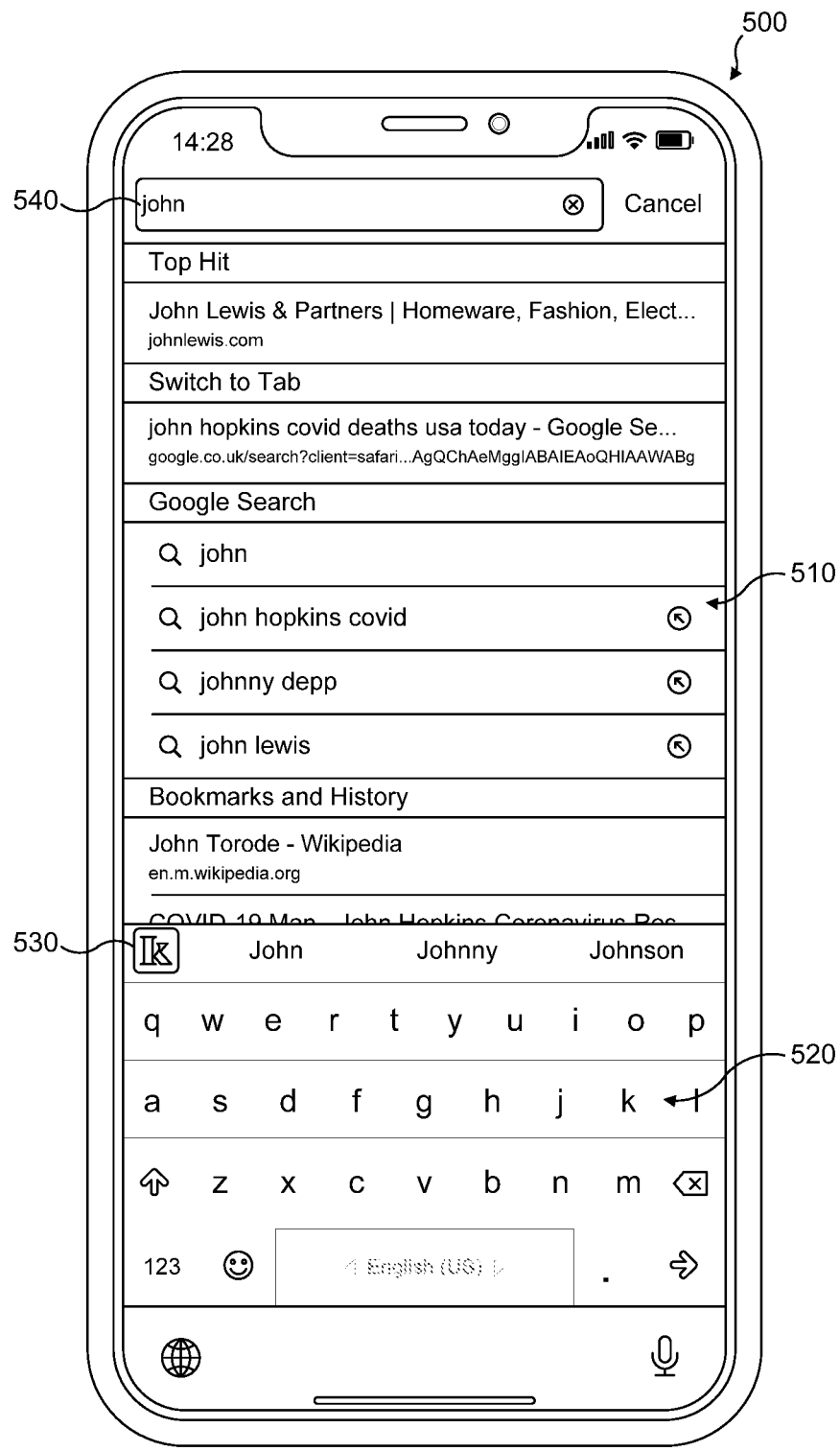
FIG. 5A illustrates a display on a mobile device according to an example.

FIG. 5A shows an example display 510 on a mobile device 500 according to an embodiment. The mobile device comprises a keyboard interceptor and keyboard application providing the afore-described keyboard functionality. The display 510 shows a user interface of a keyboard application 520 running on the mobile device 500. The user interface of the keyboard application 520 features a virtual QWERTY keyboard that allows a user to input text into the mobile device. In the example shown in FIG. 5A, text is currently being typed into a web browser application. The user interface of the keyboard application 520 includes an icon 530. The icon indicates to a user that the keyboard interceptor is currently active. The icon 530 may function as the icon discussed above with respect to the custom application. The address bar 540 of the web browser application is an example of a URL text field. A user has typed "john" into the address bar 540. As a result, the keyboard interceptor has formed a search query for the text "john", as has been discussed above.

Figure 5B:
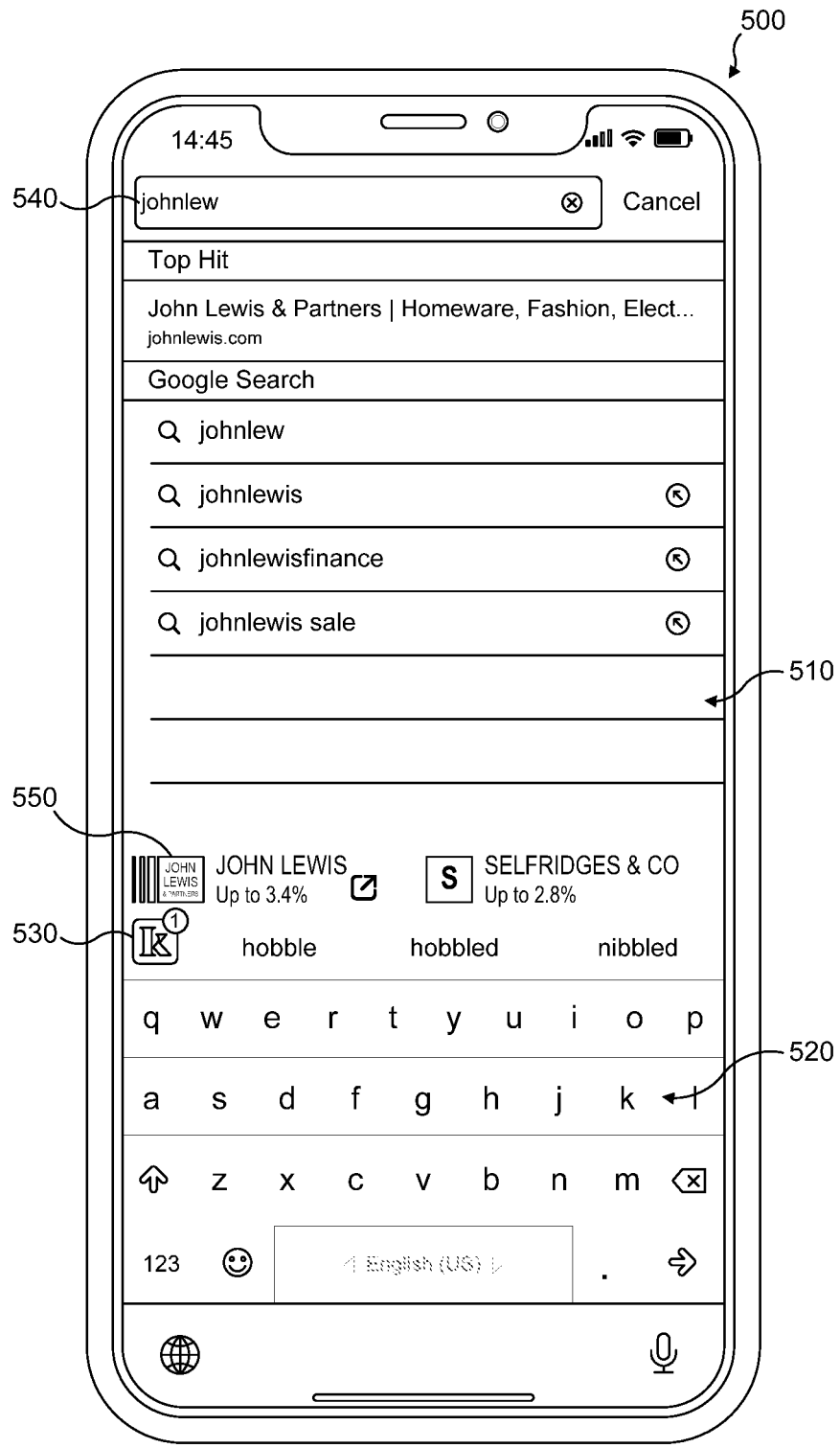
FIG. 5B illustrates the display on the mobile device according to a further example.

FIG. 5B shows the display 510 on the mobile device 500 sometime after the user first started typing. The user has now typed "johnlew" into the address bar 540. As a result, a keyboard interceptor installed on the mobile device 500 has formed a search query for the text "johnlew", as has been discussed above. This has resulted in the locating of a record comprising plurality of data associated with the merchant John Lewis. In this case, the data in the record includes a logo associated with the merchant "John Lewis", along with the text "JOHN LEWIS" and an indication of an available deal associated with the merchant. The message received by the keyboard inceptor in this example comprised the logo, text, and available deal. The keyboard interceptor has then displayed the logo 550, the text and the indication in a banner above the user interface of the keyboard application 520. The user may then select one of the logo, text and indication of the available deal in order to visit the merchant's website. As discussed above, the selection causes the keyboard application to generate a unique tracking link comprising a URL for a website associated with the merchant and an identifier associated with the user.

In the example shown in FIG. 5B, the icon 530 in the suggestion bar of the user interface of the keyboard application 520 is displaying a notification indicating that one merchant has been located. Selecting the icon 530 may activate a custom application which may display further information about the merchant as described above.

In the examples described above the keyboard application 220 is presented as a standalone application that is downloaded to a user's mobile device or as an application associated with a mobile network operator and downloaded to the user's mobile device as part of provisioning by the network operator. It is to be understood that the keyboard application 220 may be associated with any third-party application, including applications for peer-to-peer messaging. Additionally, or alternatively the functionality of the keyboard application 220—including the keyboard interceptor—may be coded into or otherwise embedded in a third-party application.

Figure 6:
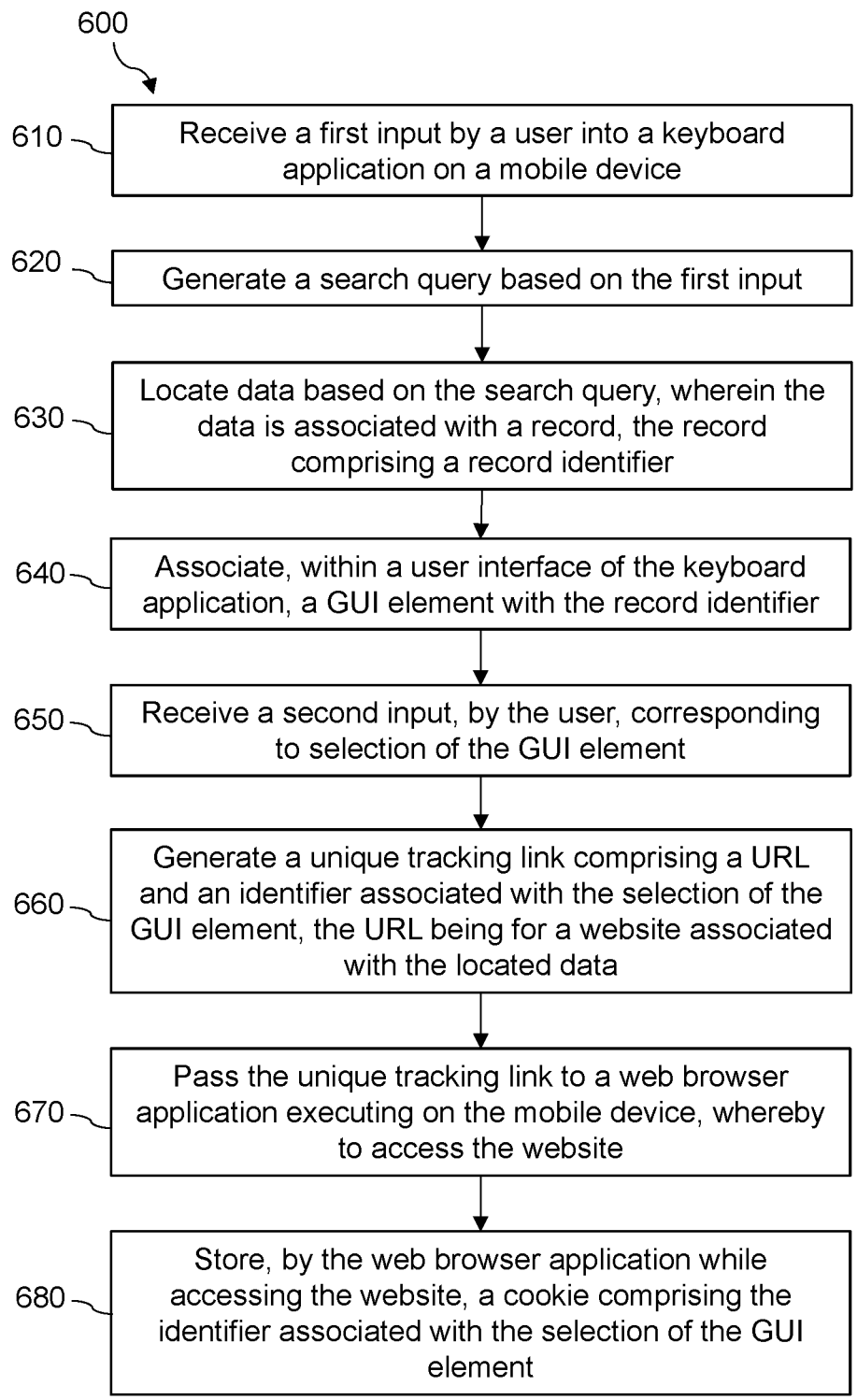
FIG. 6 a flow chart of a method according to an example.

FIG. 6 sets out, in broad terms, steps performed by a mobile device, such as the mobile devices 110, 200, and a server 150 according to the embodiments described above. At block 610, the method 600 involves receiving a first input by a user into a keyboard application 120, 220 on a mobile device 110, 200. The keyboard application 120, 220 is an application container for a keyboard SDK 130, 230 and the keyboard interceptor 140, 240. The keyboard SDK 130, 230 provides keyboard functionality to the keyboard application 120, 220. The keyboard functionality includes at least one method of providing input to the mobile device 110, 200. The keyboard application 120, 220 may be configured to display a virtual keyboard on a display of the mobile device 110, 200, such as a virtual QWERTY keyboard, allowing the user to input text into the mobile device 110, 200. Alternatively, or in addition, the keyboard SDK 130, 230 may allow input via a speech to text procedure, whereby the keyboard SDK provides functionality to record audio as a user speaks into the mobile device 110, 200. In a further example, the keyboard SDK 130, 230 may provide functionality to allow a user to provide input by drawing on the display of the mobile device 110, 200, for example, using a stylus or a finger. In any case, the keyboard interceptor 140, 240 receives a first input from the keyboard application 120, 220.

At block 620, the method 600 involves generating a search query based on the first input. The search query comprises the first input, for example, a user may type the text "amazon" via the keyboard application 120, 220. In this example, the keyboard interceptor 140, 240 determines that the text "amazon" has been typed and forms a search query based the text "amazon".

At block 630, the method 600 involves locating data based on the search query. As has been discussed above with respect to step S310, locating the data may be performed by making an API request M310 to a server 150 in communication with a database 160. The data stored on the database 160 is associated with a record, wherein the record comprises a unique record ID. Said data is related to brands, and for any given brand, the data may be stored in fields of the database 160. The fields may include one or more URLs, and metadata such as offers, keywords, categories and descriptions etc. of the brand. The data is then returned to the keyboard interceptor 140, 240 in a message M330 comprising the unique record identifier, as is shown in step S330. In a further example, as has been discussed with respect to step S440, the search query may be passed to the keyboard application 120, 220 via a message M440 which locates the data by performing a search of storage 280 of the mobile device 110, 200 for data relevant to the search query. The located data is then returned to the keyboard interceptor 140, 240 via a message M450, as shown in step S450. In yet a further example, the search query may be passed to the keyboard application 120, 220 which locates the data by forwarding an API request to the server 150. In yet another further example, the data is located in a two-step process whereby the search query is initially passed to the keyboard application 120, 220 and a search of the storage 280 of the mobile device 110, 200 is performed for data to the search query. If relevant data is found, then it is returned to the keyboard interceptor 140, 240. If relevant data is not found in the storage 280, the search query may be sent via an API request to the server, which then performs a search of the database 160.

At block 640, the method 600 involves associating, within a user interface of the keyboard application 120, 220, a GUI element with the message, as in steps S340 and S460. The GUI element may include text associated with the located data. For example, if the data found includes the text "Amazon", then the GUI element may display the text "Amazon" within the user interface of the keyboard application 120, 220. In one example, in response to receiving the data, the user interface of the keyboard application 120, 220 may further display an icon indicating that the data has been located. In response to the selection of the icon by the user, the GUI element may be displayed. The GUI element may be an existing character key within a user interface of the keyboard application 120, 220, such as an enter button.

At block 650, the method 600 involves receiving a second input, by the user, corresponding to selection of the GUI element. The selection may be achieved by the user physically pressing on a region of a display of the mobile device 110, 200 that is presently displaying the GUI element.

At block 660, the method 600 involves generating a unique tracking link comprising a URL and an identifier associated with the selection of the GUI element, in response to receiving the second input. The URL is for a website associated with the located data. In an example, the unique tracking link comprises the URL encoded with the identifier associated with the selection of the GUI element. The encoding may be achieved by appending a string associated with the identifier associated with the selection of the GUI element to the URL. The unique tracking link may be generated by making a further API request M350 to the server 150, as shown in step S350, or by passing the request M470 to the keyboard application 120, 220, as is shown in step S470. The API call M350/request M470 includes the unique record ID so that the server 150 or keyboard application 120, 220 can locate the record from which the data was located. In the case where the server generates the unique tracking link, the server sends a further request M360 to the database, as shown in step S360, in order to locate the redirect URL associated with the located data. On the other hand, when the keyboard application generates the unique tracking link, the keyboard application 120, 220 sends a further request M480 to the local storage, as shown in step S480, in order to locate the redirect URL. Alternatively, the keyboard application may send its own API request to the server, requesting generation of the unique tracking link.

At block 670, the method 600 involves passing the unique tracking link to a web browser application 250 executing on the mobile device 110, 200, whereby to access the website. When the unique tracking link is generated, it is passed to a web browser application 250 on the device 110, 200. If the user is not currently within a web browser application 250, the default web browser application of the mobile device 110, 200 may be launched and execute the unique tracking link to navigate to the website. Launching the default browser from outside of a web browser application 250 allows the method 600 to provide a shortcut to a website, while allowing tracking within the website. The unique tracking link may be sent from the server 150 to the keyboard interceptor 140, 240 via a message M370, as shown in step S370. Alternatively, the unique tracking link may be sent from the keyboard application 120, 220 to the keyboard interceptor 140, 240 via a message M490, as is shown in step S490.

At block 680, the method 600 involves storing, by the web browser application 250 while accessing the website, a cookie comprising the identifier associated with the selection of the GUI element.

The method 600 provides an enriched personal browsing experience on a mobile device by overcoming a lack of available web browser extensions on some mobile web browsers. The method 600 does this by providing an alternative to web browser extensions that utilises a keyboard interceptor. The operation of the keyboard interceptor enhances the functionality of a standard keyboard application by providing an automatic search option for URLs and keywords associated with URLs based on user input, and automatically generating unique tracking links that allow the user's activity to be tracked on a website. As discussed above, this is particularly useful when the domain name corresponds to a merchant.

In yet another example, the unique tracking link may not include an identifier associated with the selection of the GUI element. In this case, the operation of the keyboard interceptor provides search functionality without subsequent tracking.

In yet another example, the unique tracking link generated at step S360 in communication flow 300 may be a redirect link comprising a randomly generated click ID, an identifier of a brand, and a URL for a domain associated with an entity also associated with the server 150 instead of a URL for a website associated with data located in the database 160. The domain may be hosted by, or in communication with, an intermediary server (not shown) that is coupled to the server 150. The identifier of a brand may be a record ID associated with data located in step S320. In this example, upon launching of the redirect link in the web browser application 250, the user is directed to the intermediary server, which communicates with the server 150 to determine an appropriate website to which to direct the user. The intermediary server then generates a further unique tracking link comprising a URL for the appropriate website and the click ID previously generated. The user is then directed to the appropriate website and tracking of any user activity can be performed, as described above.

In a modification of this example, the redirect link generated at step S360 may not contain a click ID, and instead only comprise the URL of the domain hosted on the intermediary server and an identifier of a brand (record ID etc.). In this example, the redirect link may be termed a generic link because it does not contain a click ID. The user may have an identifier stored on their mobile device 200 which identifies the user to the intermediary server. In one example, the identifier is a cookie stored in the web browser application 250 and downloaded when the user previously visited the intermediary server. In other examples, this identifier may be stored in local storage 280 and generated in an initial configuration of the keyboard interceptor 240 and/or keyboard application 220, amongst other examples. When the browser navigates to the domain, the intermediary server identifies the user from the identifier and communicates with the server 150 to generate a unique tracking link comprising a URL for a website associated with the brand, and a click ID.

Peer-to-Peer Communication Implementation

In a further example implementation of the present disclosure, a link may be generated by a keyboard interceptor operating on a mobile device of a first user and sent, via a communications application, to one or more second users.

For example, with reference to block 680 of the method 600 described above, when a first user is currently in a messaging application, the generated unique tracking link may be pasted into a text field of the messaging application. The first user may then send a message to a second user, wherein the message comprises the unique tracking link. The second user may then select the unique tracking link. Any resulting activity of the second user may then be attributed to the first user. This is useful when the unique tracking link is associated with a merchant. Any purchases made by the second user on the merchant's website will be attributed to the first user. The first user may then receive a reward based on the purchase by the second user.

In general terms, the keyboard interceptor 240 operating on the device of the first user may be configured to allow the insertion of a link into a communication from the first user to one or more second users. In the following passages of the disclosure, the first user will be referred to as the sender, and the second user(s) will be referred to as the recipient(s). The sender's mobile device 200 comprises the keyboard interceptor 240.

The recipient(s) is/are identifiable to an entity associated with the server 150 via the intermediary server discussed above. For example, the recipient(s) may have the keyboard interceptor 240 installed on their mobile device 200 and may have previously visited the intermediary server through an action of their keyboard interceptor 240. By "visited" it is to be understood that a link has previously been accessed via the keyboard interceptor 240, causing the keyboard interceptor 240 to send a message to the intermediary server e.g. via a bespoke API, causing the intermediary server to download a cookie to the recipient's device, for use in identifying the recipient to the intermediary server. For example, the recipient may be a user who has utilized the keyboard interceptor 240 in accordance with the "Single User Implementation" described above, in particular for a case in which the Single User Implementation involves use of an intermediary server. In such implementations a cookie corresponding to the intermediary server may have been downloaded to the recipient's web browser application. As an alternative to a cookie, the bespoke API may cause the intermediary server to send, and the web browser application to store, the identifier for the user that is stored in the database 160 in association with the unique record ID when generating the unique tracking link (steps S360, S370).

As a further alternative, or in addition, the recipient(s) may have an application installed on their mobile device 200 comprising an SDK associated with the entity also associated with the server 150. An identifier identifying the recipient to the intermediary server may have been generated and stored on the recipient's mobile device 200 as part of an initial configuration of the application.

In any of these example implementations the result is that an identifier (cookie, or non-cookie) is stored locally for use in identifying the recipient to the intermediary server when the recipient accesses a link that it receives from a sender, as will now be described.

The keyboard interceptor 240 on the sender's mobile device 200 may first determine that the sender is currently providing input into a communications application. A communications application is any application which can be used by the sender to communicate with the one or more recipients. Examples include, but are not limited to, text messaging applications, email applications, messenger applications such as Facebook® Messenger, WhatsApp®, Snapchat®, social media applications such as Facebook®, Instagram®, YouTube®, Twitter® and LinkedIn©. The communications application may be a web browser application into which the first user is communicating with one or more recipients using a web-based messenger service or a posting on a website, for example. Types of communications include, but are not limited to text messages, emails, messenger application messages, social media posts, website postings, YouTube® description postings and browser-based communications.

To determine that the sender is currently providing input into a communications application, the keyboard interceptor 240 may detect the current application type and/or determine that the sender is providing input into a field associated with a communication, which may involve determining that the field is a not one of a URL, browser, or search field.

When it is determined that the sender is providing input into a communications application, steps S310-S350 or S430-S470 may be performed as described above with regards to FIGS. 3 and 4. However, in this further embodiment, at step S360 (or step S480), a generic link is generated comprising: a URL for a domain hosted by an intermediary server coupled to the server 150, and an identifier of a brand, such as a record identifier, as discussed above. The generic link directs to the domain associated with an entity also associated with the server 150, instead of to a website associated with a brand in the database 160. The generic link may be generated either by the server 150 or the keyboard application 220, depending on the particular implementation, as described above with respect to the communication flows 300 and 400.

At steps S370 and S490, the generic link is passed to the sender's keyboard interceptor 240, which inserts the generic link into the communication. The sender may at first be provided with the generic link, as a paste item for example, so that they may insert the link into multiple communications with ease. Alternatively, or in addition, the keyboard interceptor 240 may automatically insert the link into the current communication. The sender may then send the communication comprising the generic link to the one or more recipients.

A recipient of the communication may click on the generic link, which launches a default web browser application installed on the recipient's mobile device 200, and directs the recipient to the domain on the intermediary server. When the keyboard interceptor 240 is installed on the recipient's mobile device 200 (i.e. included within a keyboard application 240 installed on the mobile device 200), and/or the recipient has previously visited the domain, then the recipient will be identifiable to the intermediary server through the identifier as discussed above. This identifier may be a cookie previously downloaded to the recipient's web browser application through previous interaction between the recipient and the intermediate server, or some other identifier stored on the recipient's mobile device 200 and which is accessible to the intermediary server. The intermediary server may have access to the user identity that has been assigned to the recipient by the server 150. Thus, the entity associated with the domain may identify the recipient by the user identity in the identifier.

The intermediary server may direct the recipient to a website associated with the brand via a further link, alternatively referred to below as a redirect link. This may be performed automatically by the intermediary server so that the recipient may not even be aware that they have been redirected to the intermediary server. Alternatively, the domain may include a webpage providing details of the website associated with the brand. The webpage may provide the recipient with an interactive GUI element, with which the recipient can interact in order to be directed to the website associated with the brand.

If the user presses the GUI element, then the intermediary server generates the further link. The further link comprises a URL for the website associated with the brand and an identifier of the server 150 so that any actions performed by the recipient, after being redirected to the website associated with the brand, can be attributed by the server 150. Thus, any commission earned by an action of the recipient on the website, for example a purchase, may be logged by the entity associated with the server 150.

The intermediary server may communicate with the server 150 to generate a unique tracking link comprising a URL for the website associated with the brand, a randomly generated click ID and an identifier of the server. The unique tracking link may then be stored by the server 150 in association with the recipient's user identity, as described above. Including the click ID in the unique tracking link allows any action of the recipient to be tracked. In this case, the recipient may receive commission earned by any actions performed on the website.

If, on the other hand, the recipient is not identifiable to the intermediary server, for example if the recipient does not have the keyboard interceptor 240 installed on their mobile device, then the domain still directs the recipient to the website associated with the brand via a further link comprising a URL of the website associated with the brand and an identifier of the server 150. The difference is that this recipient is not identifiable, and as a result any commission earned by an action performed by the recipient is simply associated with the entity associated with the server 150.

In some examples, the search query based on the first input by the sender may match a plurality of records in the database 160. For example, if the sender types "Nike" into a communication, then the server 150 may identify records for both the brand "Nike" and a merchant that sells Nike® products. When a recipient clicks a received generic link, at least one of the keyboard interceptor 240 on the recipient's mobile device 200 (if present) and the intermediary server may detect a current geographical location of the recipient. Based on the determined geographical location, the intermediary server, in communication with the server 150, may identify the best commission rate from the plurality of results identified in the database 160, and generate a link comprising a URL of a website associated with the result offering the best identified commission.

In a further example, the redirect link generated by the sender includes a randomly generated click ID. The click ID may be generated and stored in association with the sender's user identity as has been discussed above. When the redirect link is sent to the recipient, and the recipient clicks on the redirect link, the recipient is directed to the domain associated with the entity also associated with the server 150. In this case, the intermediary server communicates with the server 150 to generate a unique tracking link comprising a further randomly generated click ID. The click ID and the further click ID may be stored in association with one another. The intermediary server then redirects the recipient, via the unique tracking link, to a website. In this case, any action performed by the recipient on the website may be attributed to both the sender and the recipient by the server 150 via the association between the click ID and the further click ID. For example, the recipient(s) may have the keyboard interceptor 240 installed on their mobile device 200 and may have previously visited the intermediary server through an action of their keyboard interceptor 240 as discussed above. In this case, a cookie may have been downloaded to the recipient's web browser application as discussed above. Alternatively, or in addition, the recipient (s) may have an application installed on their mobile device 200 comprising an SDK associated with the entity also associated with the server 150. The identifier may have been generated and stored on the recipient's mobile device 200 as part of an initial configuration of the application. In any case, the identifier identifies the recipient to the intermediary server.

The above-described examples involving insertion of a link into a communication from a first user to one or more second users may be considered to embody the following features:

First, a method to be performed by a mobile device of a first user, the method comprising: receiving, by a keyboard application operating on a mobile device associated with the first user, a first input; generating, by the keyboard application, a search query based on the first input; locating data based on the search query, wherein the data is associated with a record stored in a database, the record comprising a record identifier; associating, within a user interface of the keyboard application, an element of a graphical user interface, GUI, of the first mobile device, with the record identifier; receiving, by the keyboard application, a second input by the first user, corresponding to selection of the element of the GUI; responsive to receiving the second input, generating a link comprising a URL and the record identifier, the URL being for a domain hosted by an intermediary server; generating a message comprising the link and sending, by a communications application operating on the mobile device, the message to a second user.

Second, a method to be performed by a mobile device of a second user in co-operation with the method performed by the mobile device of the first user, this method comprising: receiving, by a communications application operating on a mobile device of the second user, a message containing a link comprising a URL associated with a domain hosted by an intermediary server and a record identifier identifying a record stored in a database, the message originating from a mobile device of a first user; receiving an input, by the second user, corresponding to selection of the link in the message; passing the link to a web browser application executing on the mobile device of the second user, whereby to access the domain hosted by the intermediary server; generating a unique tracking link comprising a URL for a website associated with the record identifier, and an identifier associated with the selection of the link; redirecting, by the intermediary server, the second user to the website; and storing, by the web browser application on the mobile device of the second user while accessing the website, a cookie associated with the selection of the link.

As mentioned above the communications application may be one of: Facebook® Messenger, Instagram®, WhatsApp®, Snapchat®, Facebook®, YouTube®, Twitter®, LinkedIn®, and a web browser application executing one of: a web-based messenger service, and a website permitting postings by the first user. Locating the data may include forwarding an application programming interface, API, call to a server. Generating the link may comprise forwarding a further API call to the server requesting the link, the further API call comprising the record identifier. Alternatively, locating the data may include performing a search of a local storage of the first mobile device. Responsive to passing the link to a web browser application executing on the mobile device of the second user, the intermediary server may determine that an identifier identifying the second user to the intermediary server is present on the mobile device of the second user. Generating the unique tracking link and the redirecting the second user to the website may be performed automatically by the intermediary server. Alternatively, the domain hosted by the intermediary server may display a webpage comprising a further GUI element, and generating the unique tracking link is responsive to receiving, by the second user, a selection of the further GUI element. The identifier associated with the selection of the link may be randomly generated. The data may be merchant data, and the URL for a website associated with the record identifier may be a redirect URL for a website associated with the merchant. The merchant data may further comprise: a logo associated with the merchant; and an active deal associated with the merchant, and the associating the element of the GUI with the record identifier may comprise displaying the logo associated with the merchant and text indicating the active deal.

The identifier identifying the second user to the intermediary server may be a cookie or other identifier stored by the web browser application in a previous visit to the domain.

In yet a further embodiment, the link generated by the sender to be inserted into a message to one or more recipients may be a unique tracking link, generated as described above. The unique tracking link comprises a URL for a website associated with located data and an identifier associated with the selection of a GUI element on the mobile device of the sender, such as a randomly generated click ID. In this embodiment, once the unique tracking link is available to the keyboard interceptor 240, the unique tracking link may be inserted into the message. The unique tracking link may be inserted automatically by the keyboard interceptor 240 and/or made available to the sender to insert the link manually into the communication. The communication is then sent by the sender to one or more recipients. Upon receiving the communication, a recipient may select the unique tracking link which launches a default web browser application executing on the recipient's mobile device and be directed to the website associated with the located data. The cookie may comprise the identifier associated with the selection of the GUI element, which may be stored by the web browser application and used to track the recipient's actions on the website.

Advantageously, the inclusion of the identifier associated with the selection of the GUI element, such as a randomly generated click ID, provides improved security because the unique tracking link does not contain any user information, and so no user information is communicated between users and/or passed to the website. A third party who intercepts the communication or snoops on a recipient as they browse the website associated with the unique tracking link will not be able to associate the actions taken by the recipient with any individual.

The server 150 compares the unique tracking link received from the entity and the stored unique tracking links; more specifically, the server 150 compares the click ID in the unique tracking link with the identifier associated with the selection of the GUI element portions, this having been stored by the server 150. Because the identifier associated with the selection of the GUI element portions of the link will match, the server 150 can then attribute the action to a particular user. Thus, in one example, any commission earned on a purchase made by a recipient can be credited to the sender. The unique tracking link may further comprise a server identifier that identifies the server 150. In this example, an entity associated with the website in the unique tracking link can provide the server 150 associated with the server identifier an indication of the action taken by the recipient.

The above-described example involving insertion of a unique tracking link into a communication from a first user to one or more second users may be considered to embody the following features:

First, a method to be performed by a mobile device of a first user, the method comprising: receiving, by a keyboard application operating on a mobile device associated with the first user, a first input; generating, by the keyboard application, a search query based on the first input; locating data based on the search query, wherein the data is associated with a record stored in a database, the record comprising a record identifier; associating, within a user interface of the keyboard application, an element of a graphical user interface, GUI, of the first mobile device, with the record identifier; receiving, by the keyboard application, a second input by the first user corresponding to selection of the element of the GUI; responsive to receiving the second input, generating a unique tracking link comprising a URL and an identifier associated with the selection of the GUI element, the URL being for a website associated with the located data; and generating a message comprising the unique tracking link and sending, by a communications application operating on the mobile device, the message to a second user.

Second, a method to be performed by a mobile device of a second user in co-operation with the method performed by the mobile device of the first user, this method comprising: receiving, by a communications application operating on a mobile device of the second user, a message containing a unique tracking link comprising a URL for a website associated with data located in a database and an identifier associated with selection of a GUI element on a mobile device of a first user, the message originating from the mobile device of the first user; passing the link to a web browser application executing on the mobile device of the second user, whereby to access the website; and storing, by the web browser application operating on the mobile device of the second user, while accessing the website, a cookie associated with the link.

As mentioned above, the communications application may be one of: Facebook® Messenger, Instagram®, WhatsApp®, Snapchat®, Facebook®, YouTube®, Twitter®, LinkedIn®, and a web browser application executing one of: a web-based messenger service, and a website permitting postings by the first user. Locating the data may include forwarding an application programming interface, API, call to a server. Generating the unique tracking link may comprise forwarding a further API call to the server requesting the unique tracking link, the further API call comprising the record identifier. Alternatively, locating the data includes performing a search of a local storage of the first mobile device. The unique tracking link may comprise the URL encoded with the identifier associated with the selection of the GUI element. The data may be merchant data, and the URL is a redirect URL for a website associated with the merchant. The merchant data may further comprise: a logo associated with the merchant; and an active deal associated with the merchant, and the associating the element of the GUI with the record identifier may comprise displaying the logo associated with the merchant and text indicating the active deal. The cookie may allow the merchant to determine that a purchase has been made by the second user. The first user may receive a reward issued by the merchant in response to the purchase made by the second user. The method may further comprise, responsive to receiving the data, displaying an icon within a user interface of the keyboard application indicating that the data has been located; receiving a further input, by the first user, corresponding to selection of the icon, wherein displaying the element of the GUI may be responsive to receiving the further input. The identifier associated with the selection of the GUI element may be randomly generated.

The above embodiments are to be understood as illustrative examples. Further embodiments are envisaged.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method comprising:
  receiving, by a keyboard application executing on a mobile device, a first input entered by a user into a field within an application executing on the mobile device;
  determining, by the keyboard application, the field into which the first input is entered is one designated for at least one of Uniform Resource Locators, URLs, and text fields for internet searching;
  responsive to the determining, generating, by the keyboard application, a search query based on the first input;
  locating data based on the search query, wherein the data is associated with a record, the record comprising a record identifier;
  associating, by the keyboard application, an element of a graphical user interface (GUI) of the keyboard application, with the record identifier;
  receiving, by the keyboard application, a second input entered by the user, corresponding to selection of the element of the GUI;
  responsive to receiving the second input:
    generating, by the keyboard application and without user input, a unique tracking link comprising a URL and a randomly generated identifier associated with the selection of the GUI element, the URL being for a website associated with the located data; and
    passing, by the keyboard application, the unique tracking link to an address bar of a web browser application executing on the mobile device, storing, in a database, the unique tracking link in association with the record identifier and a user identifier; and
  storing, by the web browser application while accessing the website, a cookie comprising the randomly generated identifier associated with the selection of the GUI element.

2. The method according to claim 1, wherein locating the data includes forwarding an application programming interface, API, call to a server.

3. The method according to claim 2, wherein generating the unique tracking link comprises forwarding a further API call to the server requesting the unique tracking link, the further API call comprising the record identifier.

4. The method according to claim 1, wherein locating the data includes performing a search of a local storage of the mobile device.

5. The method according to claim 1, wherein the unique tracking link comprises the URL encoded with the randomly generated identifier associated with the selection of the GUI element.

6. The method according to claim 1, in which the first input is text typed by the user, the method further comprising waiting a predetermined amount of time after the user has finished typing before generating the search query.

7. The method according to claim 1, wherein the data is merchant data, and the URL is a redirect URL for a website associated with the merchant.

8. The method according to claim 7, wherein the merchant data further comprises:
a logo associated with the merchant; and
an active deal associated with the merchant,
the associating the element of the GUI with the record identifier comprises displaying the logo associated with the merchant and text indicating the active deal.

9. The method according to claim 7, wherein the cookie allows the merchant to determine that a purchase has been made by the user.

10. The method according to claim 9, further comprising receiving a reward issued by the merchant in response to the purchase made by the user.

11. The method according to claim 1, further comprising:
responsive to locating the data, displaying an icon within a user interface of the keyboard application indicating that the data has been located;
receiving a further input, by the user, corresponding to selection of the icon, wherein displaying the element of the GUI is responsive to receiving the further input.

12. A tangible, non-transitory computer-readable memory comprising instructions, that when performed by a processor of a mobile device, cause a keyboard application executing on the mobile device to:
receive, by the keyboard application, a first input entered by a user into a field within an application executing on the mobile device;
determine, by the keyboard application, the field into which the first input is entered is one designated for at least one of Uniform Resource Locators, URLs, and text fields for internet searching;
responsive to the determining, generate, by the keyboard application, a search query based on the first input;
send a request to locate data based on the search query, wherein the data is associated with a record, the record comprising a record identifier;
associate, by the keyboard application and responsive to receipt of a said record identifier, an element of a graphical user interface (GUI) of the keyboard application with the record identifier;
receive a second input entered by the user, corresponding to selection of the element of the GUI;
responsive to receiving the second input:
generate, by the keyboard application and without user input, a unique tracking link comprising a URL and a randomly generated identifier associated with the selection of the GUI element, the URL being for a website associated with the data; and
pass, by the keyboard application, the unique tracking link to an address bar of a web browser application executing on the mobile device, wherein the unique tracking link causes the web browser application to store a cookie comprising the randomly generated identifier associated with the selection of the GUI element; and
store, in a database, the unique tracking link in association with the record identifier and a user identifier.

13. The tangible, non-transitory computer-readable memory according to claim 12, wherein sending the request to locate data based on the search query comprises forwarding an application programming interface, API, call to a server.

14. The tangible, non-transitory computer-readable memory according to claim 13, wherein generating the unique tracking link comprises forwarding a further API call to the server requesting the unique tracking link, the further API call comprising the record identifier.

15. The tangible, non-transitory computer-readable memory according to claim 12, wherein the data is merchant data, and the URL is a redirect URL for a website associated with the merchant.

16. The tangible, non-transitory computer-readable memory according to claim 15, wherein the merchant data further comprises:
a logo associated with the merchant; and
an active deal associated with the merchant,
and the associating the element of the GUI with the record identifier comprises displaying the logo associated with the merchant and text indicating the active deal.

17. A system comprising:
a tangible, non-transitory computer-readable memory according to claim 13;
a database comprising a plurality of records, each of the records comprising:
a record identifier;
data; and
a URL for a website associated with the data; and
a server communicatively coupled to the database and configured to locate the data in the database in response to receiving the API call.

18. The system according to claim 17, wherein the data on the database is merchant data, and the URL is a redirect URL for a website associated with the merchant.

* * * * *